United States Patent [19]

Quinn

[11] Patent Number: 5,398,806
[45] Date of Patent: Mar. 21, 1995

[54] APPARATUS FOR PERFORMING A PLURALITY OF DISTILLATION AND REFLUX OPERATIONS SIMULTANEOUSLY WITHIN A COMPACT SPACE

[75] Inventor: Lisa C. Quinn, Baltimore, Md.

[73] Assignee: EA Engineering, Science & Technology, Hunt Valley, Md.

[21] Appl. No.: 947,429

[22] Filed: Sep. 18, 1992

[51] Int. Cl.$^6$ .............................................. B01D 3/00
[52] U.S. Cl. ..................................... 202/83; 202/152; 202/267.1; 203/DIG. 2; 422/61; 422/101
[58] Field of Search ................ 202/83, 82, 152, 160, 202/267.1; 203/DIG. 2, 99, 86, DIG. 22, 2; 422/101, 99, 61

[56] References Cited

U.S. PATENT DOCUMENTS

| | | | |
|---|---|---|---|
| 1,317,262 | 9/1919 | Bajda | 422/101 |
| 2,868,626 | 1/1959 | Allen | 422/101 |
| 3,348,921 | 10/1967 | Katz et al. | 422/61 |
| 4,303,610 | 12/1981 | Sardisco et al. | 422/61 |
| 4,303,614 | 12/1981 | Spring et al. | 422/101 |
| 4,346,057 | 8/1982 | Bowser | 422/101 |
| 4,600,473 | 7/1986 | Friswell | 422/101 |
| 5,022,967 | 6/1991 | Stieg | 202/197 |
| 5,087,422 | 2/1992 | Friese et al. | 422/61 |

FOREIGN PATENT DOCUMENTS

| | | | |
|---|---|---|---|
| 784566 | 7/1935 | France | 422/101 |
| 48593 | 2/1910 | Switzerland | 422/101 |

Primary Examiner—Christopher Upton
Attorney, Agent, or Firm—Gay Ann Spahn

[57] ABSTRACT

A mini-distillation and reflux system, kit and method in which a heating and glassware arrangement includes a heat source in contact with a heater block having apertures in its top surface for housing boiling tubes upright during a distillation or reflux operation. The boiling tubes contain sample and are for attachment of various configurations of glassware assemblies made up of individual, interchangeably connectable glassware pieces so assembled to perform different types of distillations and refluxes. The glassware pieces are of a scaled down size so that numerous distillations and refluxes can be performed simultaneously at a single heat source within a compact space to consume less laboratory space. The scaled down size of the glassware pieces also allows the boiling tubes and attached glassware assemblies to be housed freestandingly within the heater block apertures thus eliminating the time-consuming set-up of bulky support apparatus formerly necessary to support glassware assemblies above boiling receptacles in conventional distillations and refluxes.

32 Claims, 9 Drawing Sheets

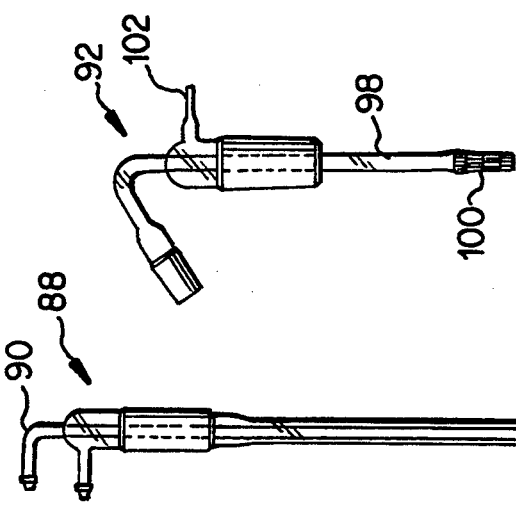
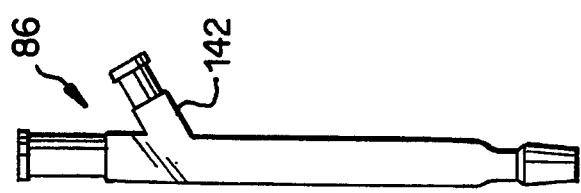
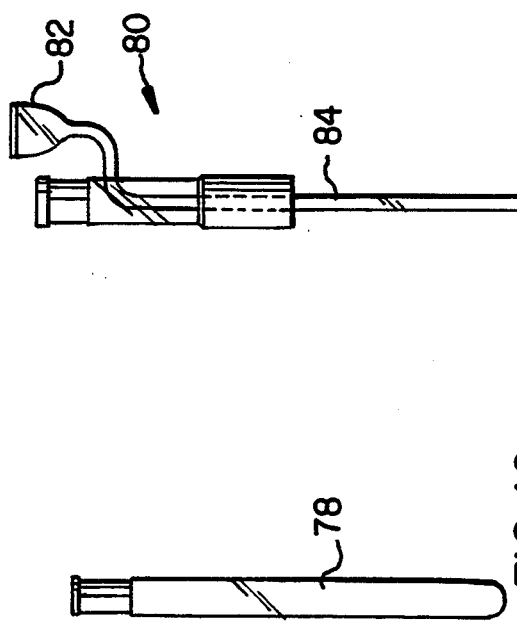
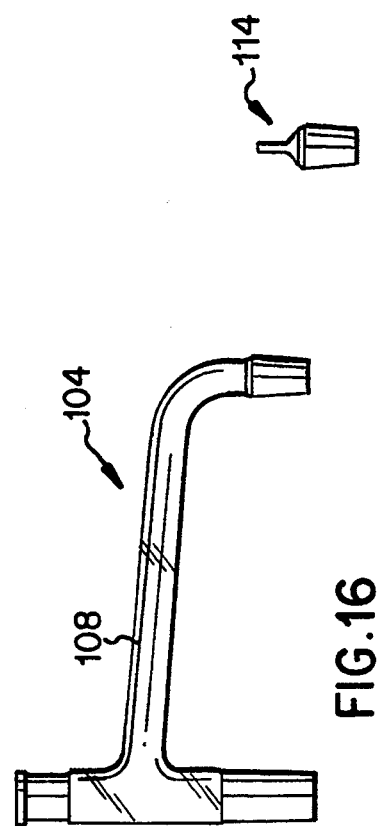
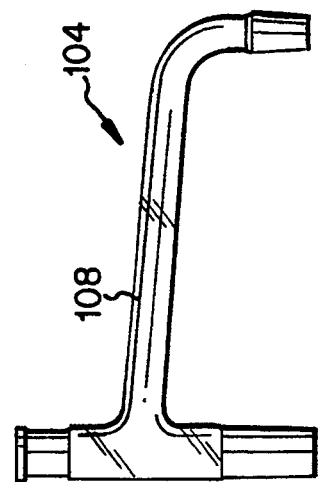

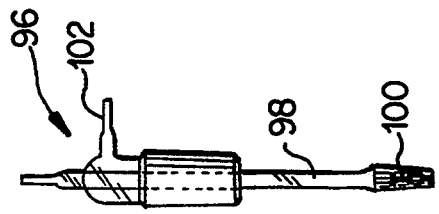
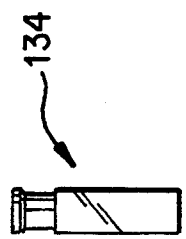
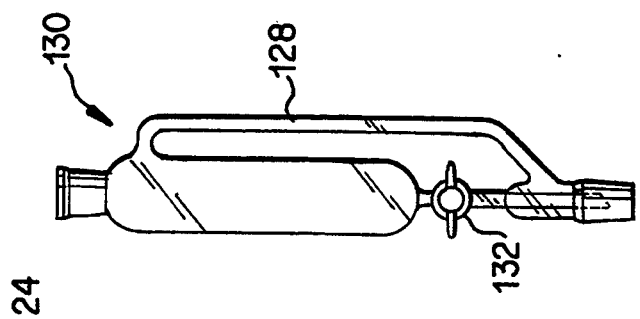
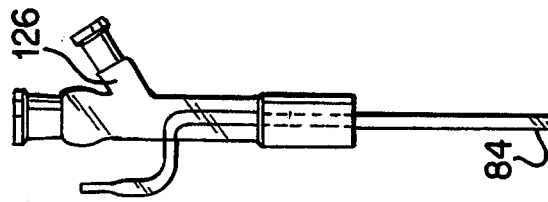
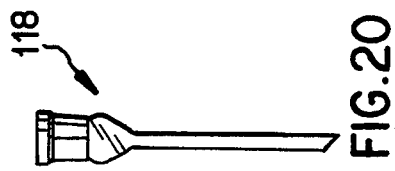
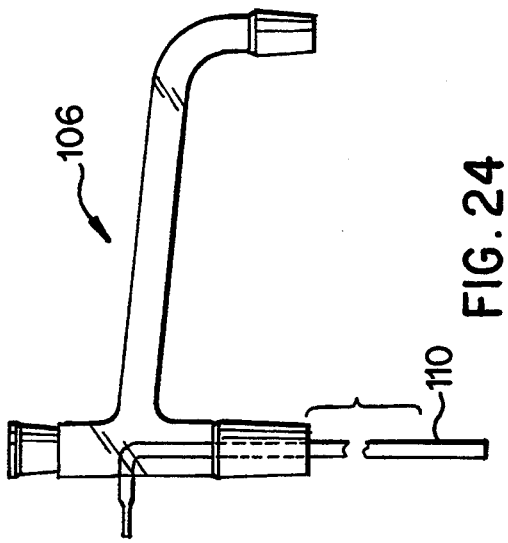
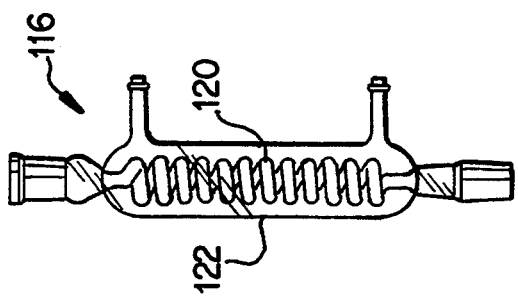

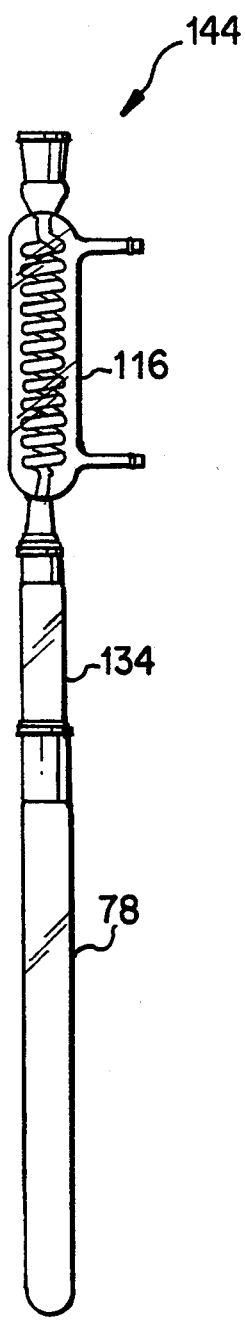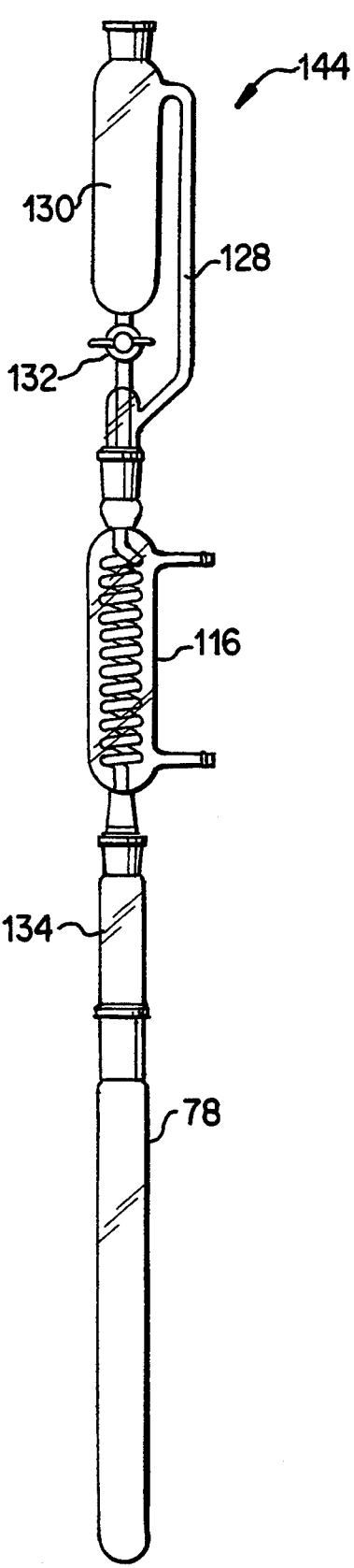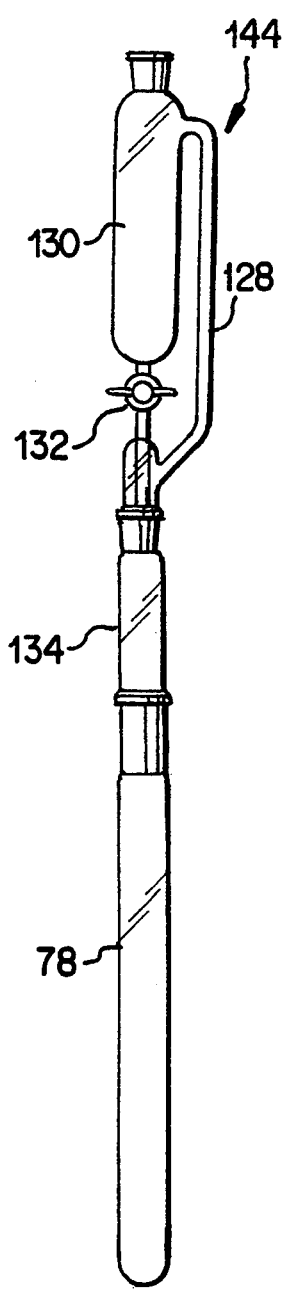
FIG. 32
FIG. 33
FIG. 34

APPARATUS FOR PERFORMING A PLURALITY OF DISTILLATION AND REFLUX OPERATIONS SIMULTANEOUSLY WITHIN A COMPACT SPACE

FIELD OF THE INVENTION

The present invention relates generally to apparatus for performing distillations and refluxes and more particularly, to an easily convertible miniaturized distillation and reflux system and kit for performing laboratory distillations and refluxes.

BACKGROUND OF THE INVENTION

Distillation and reflux are common chemical laboratory processes to prepare a substance for analysis or a subsequent chemical process.

The distillation process includes the steps of turning a substance in a liquid matrix into a vapor, cooling the vapor to condense it and collecting the resulting condensed liquid in order to separate the analyte of interest from its original matrix. Distillations are often carried out under specific temperatures to allow separation of compounds by their boiling point differences. Two common variations on the basic distillation process are often used. The first variation includes introducing an inert gas such as nitrogen or helium into the distillation apparatus to avoid atmospheric contamination or reacting the distilled compounds with atmospheric components during distillation. A second variation includes generating a gas from a heated liquid and collecting the evolved gas as it bubbles through an absorbing solution.

Reflux is the process of heating a substance in a liquid matrix to boiling to generate a vapor, continuously, condensing the vapor and returning the condensed vapor to the boiling liquid matrix. Refluxing is often necessary for chemical reactions that require elevated temperatures for long periods of time to reach completion. Refluxing allows prolonged heating of the sample without significant loss of original liquid matrix volume due to evaporation. Refluxed chemical reactions may also require the slow addition of a reagent during the reflux process to allow completion of specific chemical reactions.

Distillation and reflux processes have applications in both industrial-scale chemical production as well as bench-scale laboratory uses. With respect to bench-scale laboratory applications, standard procedures have developed for performing either the particular type of distillation necessary to remove the analyte of interest from the sample or the particular type of reflux necessary to chemically process the analyte of interest. For analytes such as cyanide, phenolic compounds, ammonia, hydrogen fluoride, volatile acids, sulfides and sulfites, to be removed from sample by distillation or chemically processed by refluxing, according to the standard procedures, a complicated, time-consuming distillation or reflux process is required which uses low-throughput, large volume, manual distillation or reflux apparatus including expensive, fragile, large glassware components that are not interchangeable between distillation or reflux methods.

The current state of the art is illustrated in FIGS. 1-5 which show prior art laboratory distillation and reflux apparatus. The prior art apparatus of FIGS. 1-5 disclose distillation and reflux glassware which is bulky and cumbersome due to the use of large boiling flasks. The large boiling flasks require correspondingly large glassware components which are expensive, fragile, and which require support apparatus such as rings, clamps, ring stands and lattice to support the glassware components above the boiling flasks. FIGS. 1-5 further illustrate that conventional large boiling flasks typically have one to three inlet necks for placing the sample and reagents in the flask and for attaching the other glassware pieces required to perform various distillations and refluxes, with the particular distillation or reflux method being performed dictating the type of multi-necked flask to be used. The different types of multi-necked boiling flasks each require specialized glassware components for connection only to that particular boiling flask such that glassware components are not interchangeable between distillation and reflux methods.

In use, the prior art distillation or reflux apparatus shown in FIGS. 1-5 typically require numerous hours for completion of the distillation or reflux process due to the lengthy assembly, disassembly and cleaning of the glassware. The large boiling flasks of prior art distillation or reflux apparatus typically require as much as 500 to 1000 mL of sample and such large sample sizes require correspondingly large volumes of costly reagent.

Each large boiling flask also requires a separate heating mantle, thereby consuming a lot of precious laboratory bench space. Since the boiling flasks often have irregular contact with the heating mantle, variable heating and generation of considerable waste heat during use often results. The heating mantles often become covered with reagent due to reagent spillovers onto the heating mantles causing the heating mantles to smoke during use. A support apparatus is required to hold the boiling flasks to the heating mantle while a second support apparatus is often required to support and distribute condenser water and gas or vacuum hoses to the distillation or reflux glassware with both supports requiring much lab space and set-up time.

U.S. Pat. No. 5,022,967 to Stieg discloses microdistillation apparatus which includes a plastic digestion tube within a micro-distillation column that is meant to be disposable after use. The apparatus uses a hydrophobic membrane in place of a conventional glass, cold water condenser and thus does not preserve the original distillation mechanism of the conventional glass, distillation glassware specified in standard distillation procedure. Further, the plastic fabrication of the micro-distillation column makes it unsuitable for use with organic solvents.

Thus, a need exists for laboratory distillation and reflux apparatus in which miniaturized glassware receptacles and components are used to perform distillations or refluxes of numerous smaller sample volumes, i.e., those in the 10 to 50 mL range, simultaneously at a single heat source.

A need also exists for laboratory distillation and reflux apparatus which includes glassware components that are interchangeable between distillation and reflux methods.

Still another need exists for laboratory distillation and reflux apparatus which includes glassware capable of being free-standing in the heating apparatus so as to eliminate the need for bulky support lattices and cumbersome heating mantles for each distillation or reflux which consumes precious laboratory space.

It would therefore be advantageous to scale down the glassware and heating arrangements of conventional distillation and reflux apparatus into a more compactly sized distillation and reflux system which allows numerous distillations and refluxes to take place simultaneously at a single heat source. The present invention provides an easily convertible mini-distillation and reflux system which includes scaled-down glassware pieces for connection to a boiling tube to be inserted into apertures of a heater block capable of holding glassware upright and freestanding in order to distill or reflux numerous samples simultaneously at a single heat source.

One advantage of the mini-distillation and reflux system of the present invention is that less laboratory bench space is required for distillations since numerous distillations can take place simultaneously within a compact space at a single heat source.

Another advantage of the mini-distillation and reflux system of the present invention is that the less bulky, miniaturized glassware is free-standing within a heater block to thus eliminate the need for support apparatus.

Still another advantage of the mini-distillation and reflux system of the present invention is that the assembly of both the miniaturized system and of the miniaturized glassware pieces is quicker and easier due to its smaller size. Thus, time and labor expenses, glassware breakage and replacement costs are all decreased.

Still another advantage of the mini-distillation and reflux system of the present invention is the use of a tubing distribution panel for delivery of condenser water and inert gases or vacuum to each glassware apparatus. The tubing distribution panel allows for quick, easy assembly of distillation and reflux equipment by eliminating bulky hose connectors and support lattice for hoses and tubing to decrease time and labor expenses.

Still another advantage of the mini-distillation system of the present invention is that less sample volume and reagents are required resulting in reduction in chemical and waste disposal costs.

Still another advantage of the mini-distillation and reflux system of the present invention is that a single heat source for multiple apparatus requires access to fewer electrical outlets and use of a low wattage single heat source results in decreased electrical operating costs.

The mini-distillation and reflux system of the present invention provides a distillation and reflux system that incorporates all of the advantages of a compactly sized system with interchangeable parts while allowing the scaled down interchangeable glassware to function in the same manner as the conventional glassware, thus preserving the chemical distillation and reflux mechanism of the original, conventional glassware specified in standardized distillation or reflux methods. The system further provides a major innovation by allowing a single inlet or one-necked boiling tube to replace the large volume, multi-necked boiling flasks of conventional distillation apparatus while functioning in the same manner as the one-, two-, or three-necked boiling flasks of the prior art.

SUMMARY OF THE INVENTION

The present invention provides a mini-distillation and reflux system in which a scaled down heating and glassware arrangement includes a heat source in contact with a heater block and glassware assemblies attached to boiling tube are held upright in apertures in the heater block. The glassware assemblies are made up of individual, interchangeable glassware pieces to form various configurations for performing different types of distillations and refluxes. The scaled down glassware pieces are capable of functioning in the same manner as conventional distillation glassware thereby preserving the chemical distillation and reflux mechanism of the original, conventional glassware specified in standardized distillation or reflux procedure. A tubing distribution panel may be included as needed for attachment of condenser water, vacuum or gas source to the glassware assemblies via hose or flexible tubing. A mini-distillation and reflux kit includes a heat source, a heater block, at least sixteen interchangeably connectable glassware pieces capable of forming at least nine glassware assemblies for performing different types of distillations and refluxes, and a tubing distribution arrangement.

A method for performing distillations or refluxes includes using miniaturized glassware to form glassware assemblies for attachment to boiling tubes for insertion into apertures of a heater block in contact with a heat source so that the boiling tubes and glassware assembly arrangements are free-standing during a distillation or reflux in order for numerous distillations or refluxes to be performed simultaneously at a single heat source.

BRIEF DESCRIPTION OF THE DRAWING

FIG. 10 is a front elevational view of a boiling tube of the glassware of the mini-distillation and reflux system and kit.

FIG. 11 is a front elevational view of a reagent inlet tube adapter of the glassware of the mini-distillation and reflux system and kit.

FIG. 12 is a front elevational view of a cold finger condenser jacket of the glassware of the mini-distillation and reflux system and kit.

FIG. 13 is a front elevational view of a cold finger condenser of the glassware of the mini-distillation and reflux system and kit.

FIG. 14 is a front elevational view of bubbler of the glassware of the mini-distillation and reflux system and kit.

FIG. 15 is a front elevational view of a bubbler vessel of the glassware of the mini-distillation and reflux system and kit.

FIG. 16 is a front elevational view of a sloped T-joint of the glassware of the mini-distillation and reflux system and kit.

FIG. 17 is a front elevational view of a stopper of the glassware of the mini-distillation and reflux system and kit.

FIG. 18 is a front elevational view of a gas inlet of the glassware of the mini-distillation and reflux system and kit.

FIG. 19 is a front elevational view of a mini-Graham condenser of the glassware of the mini-distillation and reflux system and kit, having condenser jacket partially removed for clarity.

FIG. 20 is a front elevational view of a condenser stem of the glassware of the mini-distillation and reflux system and kit.

FIG. 21 is a front elevational view of an inlet adapter of the glassware of the mini-distillation and reflux system and kit.

FIG. 22 is a front elevational view of a side arm addition funnel of the glassware of the mini-distillation and reflux system and kit.

FIG. 23 is a front elevational view of a second optional bubbler of the glassware of the mini-distillation and reflux system and kit.

FIG. 24 is a front elevational view of a T-joint with gas bubbler of the glassware of the mini-distillation and reflux system and kit.

FIG. 25 is a front elevational view of a joint reducer of the glassware of the mini-distillation and reflux system and kit.

FIG. 32 is a front elevational view of a first embodiment of a third glassware assembly and attached boiling tube for insertion into an aperture of the heater block of FIG. 6 of the mini-distillation and reflux system and kit.

FIG. 33 is a front elevational view of a second embodiment of the third glassware assembly and attached boiling tube of FIG. 32.

FIG. 34 is a front elevational view of a third embodiment of the third glassware assembly and attached boiling tube of FIG. 32.

DETAILED DESCRIPTION OF THE INVENTION

Figure 1:
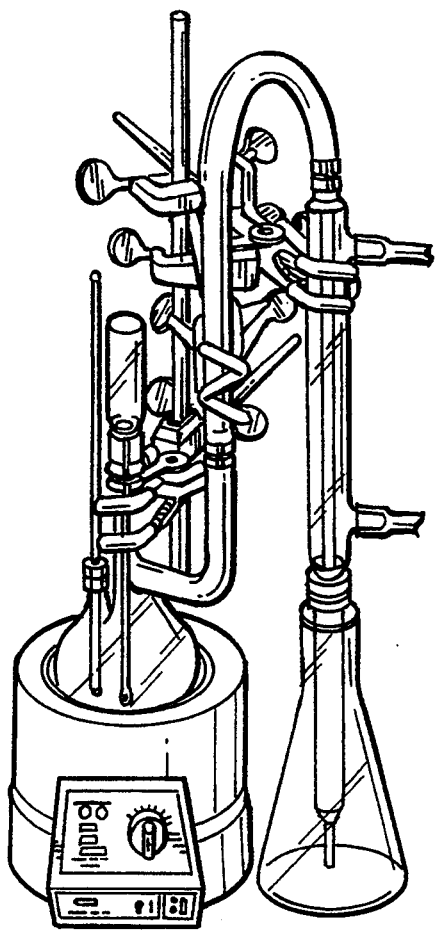
FIG. 1 is a front elevational view of a prior art distillation and reflux apparatus.
Figure 2:
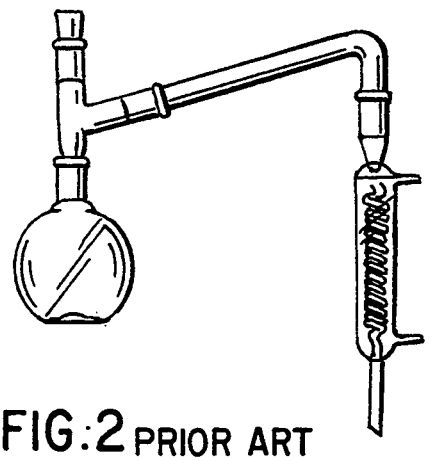
FIG. 2 is a front elevational view of a prior art distillation apparatus.
Figure 3:
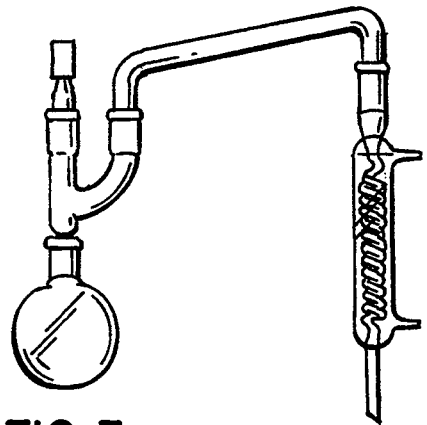
FIG. 3 is a front elevational view of a prior art distillation apparatus.
Figure 4:
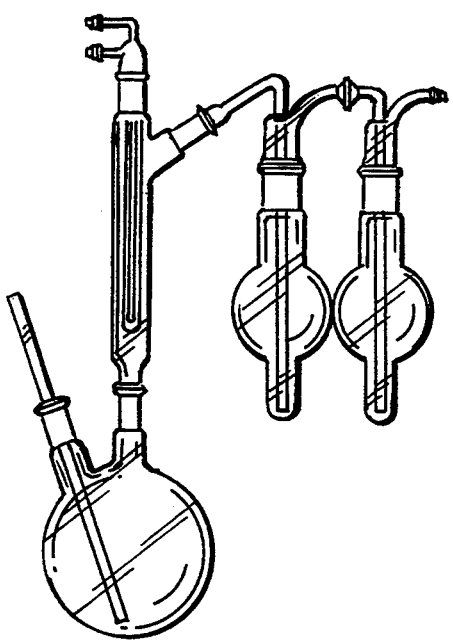
FIG. 4 is a front elevational view of a prior art distillation apparatus.
Figure 5:
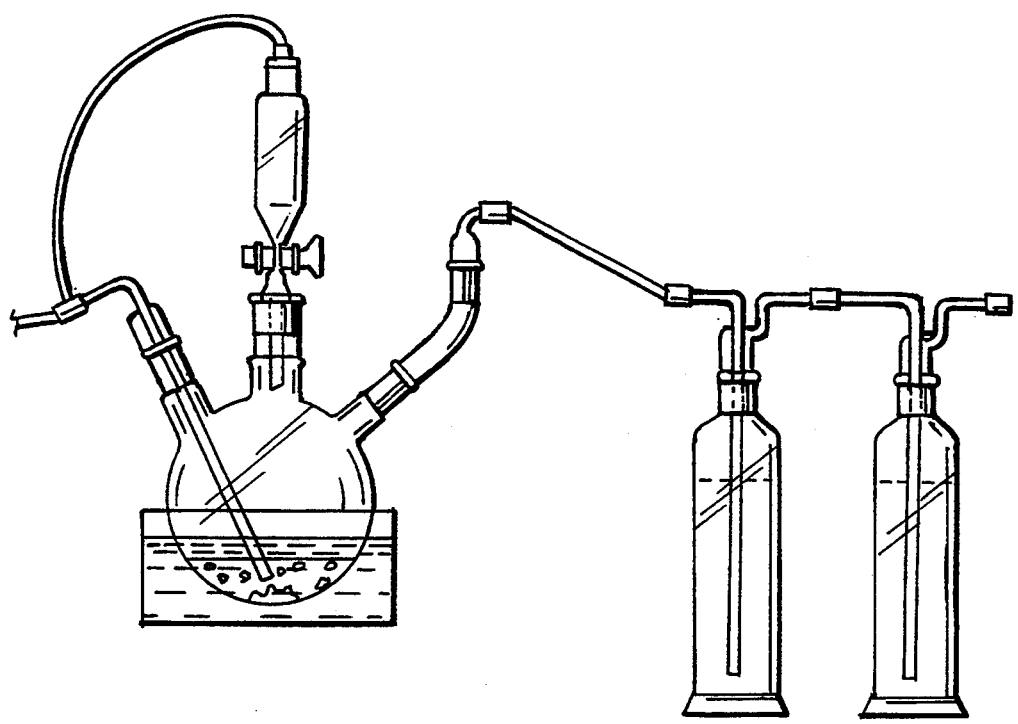
FIG. 5 is a front elevational view of a prior art distillation apparatus.
Figure 6:
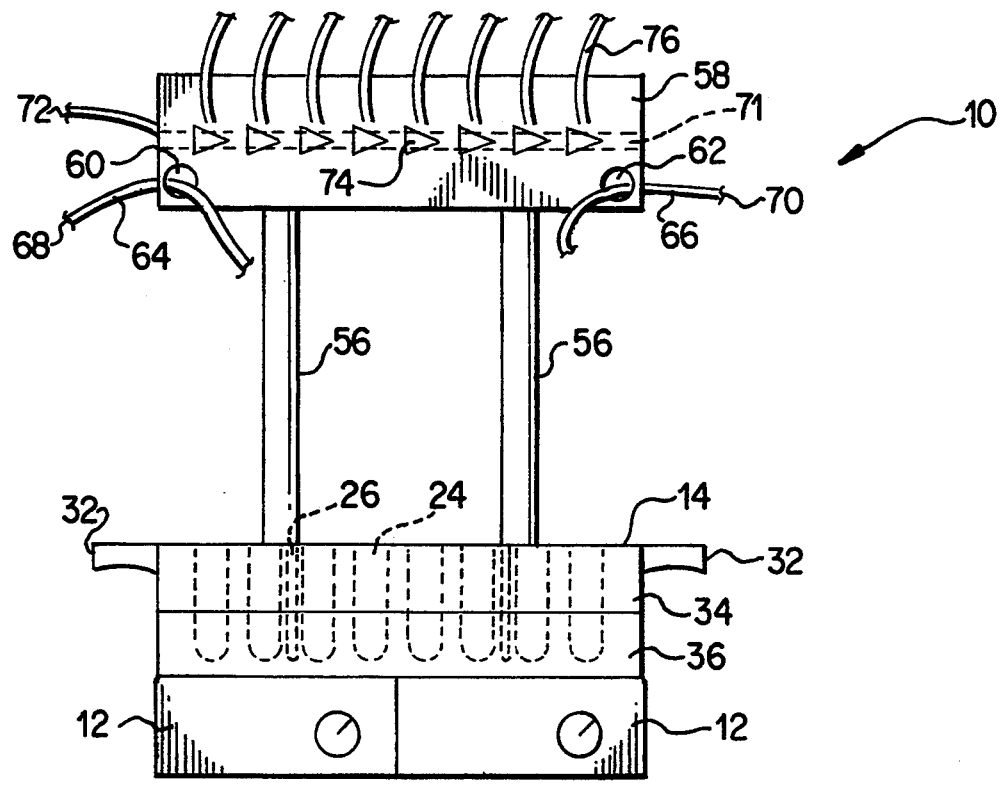
FIG. 6 is a front elevational view of a mini-distillation and reflux system and kit having glassware assemblies with attached boiling tubes for insertion into apertures of a heater block removed for clarity.

Referring to FIG. 6, in a preferred embodiment of the present invention, a mini-distillation and reflux system and kit 10 is shown with insertable glassware removed for clarity. A heat source 12 is shown positioned under and in contact with a heater block 14. The heat source 12 of the preferred embodiment of the invention is shown in FIG. 6 as two conventional hot plates such as those sold by Corning Glass Corporation, Model No. PC-300, having an electrical rating of 120 VAC, 575 watts, however, any heat source capable of supplying equivalent power could be used without departing from the spirit or scope of the invention.

Figure 7:
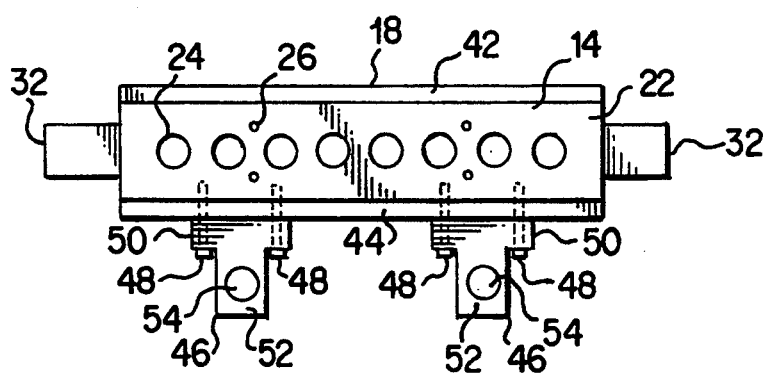
FIG. 7 is a plan view of the heater block of FIG. 6 of the mini-distillation and reflux system.
Figures 8, 9:
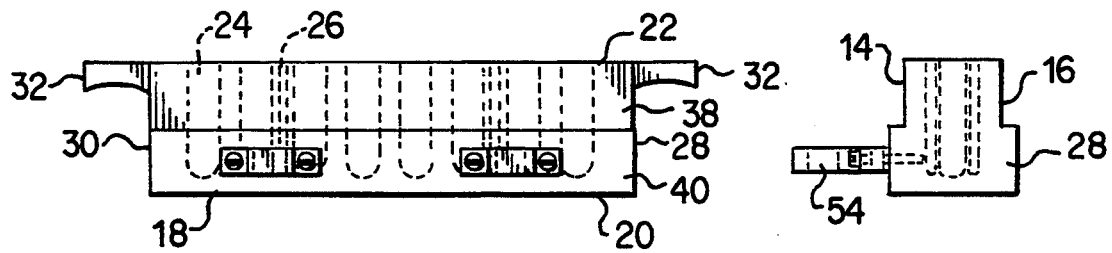
FIG. 8 is a back elevational view of the heater block of FIG. 6 of the mini-distillation and reflux system.
FIG. 9 is a side elevational view of the heater block of FIG. 6 of the mini-distillation and reflux system.

With reference to FIGS. 7, 8 and 9, the heater block 14 of the preferred embodiment is shown having an inverted T-shaped cross-section 16 throughout the length 18 of the heater block 14. The inverted T-shaped cross-section of the heater block 14 allows the heater block 14 to have a rectangular bottom surface 20 which is larger in area than the rectangular top surface 22. A heater block 14 with a bottom surface 20 of larger surface area than the top surface 22 is primarily to provide stability for the heater block 14 against tipping over and also for providing a larger surface area to contact the heat source 12. Thus, the heater block 14 is not limited to an inverted T-shaped cross-section. Both a rectangular cross-section and a cross-section in the shape of an Erlenmeyer flask, i.e., rectangular top and partial triangular bottom cross-section, have been contemplated for the heater block 14.

In the preferred embodiment, the rectangular top surface 22 of the heater block 14 contains eight large circular apertures 24 and four small circular apertures 24. FIG. 7 illustrates that the large apertures 24 are approximately one-inch in diameter, are evenly spaced across the approximately fifteen-inch length of the heater block 14 and are centerline along a lengthwise centerline of the heater block 14. The small apertures 26 are approximately one-fourth of an inch in diameter, are spaced in the length direction of the heater block 14 to be halfway inbetween the second and third large apertures 24 from either end of the heater block 14, and are spaced in the width equidistant from the lengthwise centerline so that the small aperture's circumference is tangent to a line tangent to the large aperture's circumference. The number and positioning of the large and small apertures, as described in accordance with the preferred embodiment, does not limit the invention and any number of large and small apertures may be positioned in any manner that facilitates the performance of distillation and reflux processes.

FIGS. 6, 8, and 9 illustrate that the large and small apertures 24, 26 have a U-shaped cross-section throughout the depth of the heater block 14. In other words, the length of the U-shaped cross-section of large and small apertures 24, 26 is less than the distance between the rectangular top surface 22 of the heater block 14 and the rectangular bottom surface 20 of the heater block 14 so that the apertures do not pierce the heater block in order for the large apertures 24 to be capable of holding boiling tubes and the small apertures 26 to be capable of holding thermometers. The shape of the large and small apertures is not limited and apertures of any shape capable of holding boiling tubes and thermometers may be used.

The heater block 14 has an inverted T-shaped right side surface 28 and an inverted T-shaped left side surface 30 such that each surface 28, 30 has a handle 32 attached to the upper leg of the inverted T-shaped surface. The heater block 14 has a rectangular front upper surface 34, a rectangular front lower surface 36, a rectangular back upper surface 38, a rectangular back lower surface 40, and back and front rectangular shelves 42, 44. Two T-shaped aluminum supports 46 are attached to the back lower surface 40 of the heater block 14 by bolts 48 through the crossbars 50 of the T-shaped supports 46 to hold the crossbars 50 against the back lower surface 40 of the heater block 14. The legs 52 of the T-shaped supports 46 have cylindrical apertures 54 through the T-shaped supports' thickness for holding a support rod 56 upright as shown in FIG. 6 in order to support a tubing distribution panel 58.

The heater block 14 is preferably made of aluminum, however, any material having heat-conductive properties in order to conduct heat from the hot plates in contact with the heater block to the boiling tubes to be placed in the apertures of the heater block, could be used.

Referring again to FIG. 6, a tubing distribution panel 58 is shown supported above the heater block 14 on two support rods 56 inserted through the cylindrical apertures 54 of the legs 52 of the T-shaped supports 46 attached to the back lower surface 40 of the heater block 14. In the preferred embodiment of the invention, the tubing distribution panel 58 includes two condenser water hose support apertures 60, 62 located on opposing lower left- and right-hand corners of the panel 58 through which condenser water inlet and outlet hoses 64, 66 are threaded. Condenser water inlet hose 64 is threaded through aperture 60 on the left side of panel 58 and leads from a condenser water source 68 for connection to the first glassware assembly. Condenser water outlet hose 66 is threaded through aperture 62 for connection to a last glassware assembly and leads to a drain or collector 70. The condenser water inlet and outlet hoses 64, 66 are constructed and arranged so as to be connected in series for flowing condenser water through the glassware apparatus inserted in the heater block 14 as needed to perform various types of distillations and refluxes. The tubing distribution panel 58 further includes a main channel 71 leading from a gas or vacuum source 72 to eight valves 74, each valve 74 for connection, as needed, to one of the glassware apparatus inserted in the heater block 14 via vacuum or gas hoses 76.

In the preferred embodiment of the invention, sixteen glassware pieces as shown in FIGS. 10-25 are capable of forming nine glassware assemblies as shown in FIGS. 26-34, although the number of glassware pieces and assemblies does not limit the invention since it is contemplated that as many glassware pieces and assemblies as needed to perform varying distillations and refluxes may be incorporated.

The glassware pieces are of a scaled down size in order to be interchangeably connectable to each other for ultimate connection of the assembled glassware pieces to a boiling tube 78 as shown in FIG. 10. The boiling tube 78 has one inlet or neck and is capable of holding up to a 50-mL volume of sample. The boiling tubes may be inserted into the large apertures 24 through the top surface 22 of the heater block 14 after attachment of a glassware assembly in order to perform various types of distillations and refluxes.

FIG. 11 illustrates a reagent tube inlet adapter 80 which is a glassware piece specially designed to be attached to a boiling tube 78 as shown in FIG. 10 in order to allow the boiling tube to function as a two-necked flask. The adapter 80 allows for air flow and addition of reagents through the funnel-shaped inlet 82 attached to a long z-shaped inlet tube 84 which extends to the bottom of the boiling tube 78 when the adapter 80 is inserted into the boiling tube 78.

FIGS. 12 and 13 illustrate a cold finger condenser jacket 86 and cold finger condenser 88, respectively. The condenser 88 includes a cold finger 90 through which condenser water flows. The condenser 88 is surrounded by the jacket 86 so that when the condenser 88 condenses vapor, the condensate drips back into the boiling tube 78, while gases enclosed by the jacket 86 are allowed to proceed to the next attached glassware piece.

FIGS. 14, 15 and 23 illustrate a first bubbler 92, bubbler vessel 94 and second bubbler 96, respectively, which can be connected in series to first bubbler 92. Air and generated gases enter the bubbler 92 and proceed to flow through a short glass tube 98 which terminates as a glass frit 100 or impinged tube bottom. The frit 100 allows gases to be discharged as fine bubbles into a solution contained in the bubbler vessel 94. The bubbler 92 includes a vacuum inlet stem 102 to which a vacuum source or second bubbler 96 may be attached.

FIGS. 16 and 24 illustrate a sloped T-joint 104 and sloped T-joint with gas bubbler 106, respectively. Both sloped T-joint 104 and sloped T-joint with gas bubbler 106 are for connection to a boiling tube 78. The sloped T-joint 104 is attached to a condenser so that the downward slope of the T-joint arm 108 allows vapor to condense on the sloped T-joint 104 and flow down into the condenser rather than back to the boiling tube 78. The sloped T-joint with gas bubbler 106 functions in the same way as the sloped T-joint 104: except that an inert gas is introduced into the T-joint with gas bubbler 106 and exits the bottom of the bubbler stem 110 which extends to the bottom of the boiling tube 78. The bubbling action agitates the heated sample. Thus, the sloped T-joint with gas bubbler 106 when attached to the boiling tube 78 allows the boiling tube 78 to have two inlets and to act in a manner similar to a two-necked flask of the prior art.

FIGS. 17 and 18 illustrate a stopper 112 and gas inlet 114, respectively. Both the stopper 112 and gas inlet 114 seal the top of a sloped T-joint 104, however, the stopper 112 does so to allow vapor to travel down the sloped arm 108 of the T-joint 104 rather than escape, whereas the gas inlet 114 allows introduction of an inert gas at the top of the T-joint 104.

FIGS. 19 and 20 illustrate a mini-Graham condenser 116 and condenser stem 118. The mini-Graham condenser 116 functions to condense vapors in a coiled glass tube 120 encased in a jacket 122 of cold water. The condensed distillate exits through the bottom of the condenser 116 to the condenser stem 118 which is submerged in a solution contained in a collection vessel (not shown).

FIG. 21 illustrates a Y-shaped adapter 124 having a main tubular section and a tubular exit port 126 which connects to a boiling tube 78 to allow the one-necked boiling tube 78 to function as a multi-necked flask. The adapter 124 includes a long z-shaped gas inlet stem 84 having a crimped stem on an upper end where a source of inert gas may be applied. The bottom of the z-shaped inlet stem 84 is not crimped and extends almost to the bottom of the boiling tube 78 where the flow of bubbles exiting the inlet stem 84 serves to agitate and purge the boiling tube contents with inert gas. The port 126 is sloped upward to form a Y with the adapter 124 and to assist condensed vapors forming on the walls of the adapter 124 to drip back down into the boiling tube 78.

FIG. 22 illustrates a side arm addition funnel 130. Inert gas flow may be introduced at the top of the funnel 130. Liquid reagents are held in the funnel 130 by a stopcock 132 which when opened allows the reagent to flow downward. The side arm addition funnel 130 allows inert gas flow to bypass the stopcock 132 thus permitting gas flow to continue through the side arm 128 even when the stopcock 132 is closed.

FIG. 25 illustrates a joint reducer 134 which connects a boiling tube 78 to another glassware piece such as a mini-Graham condenser 116 or a side arm addition funnel 130.

Figure 26:
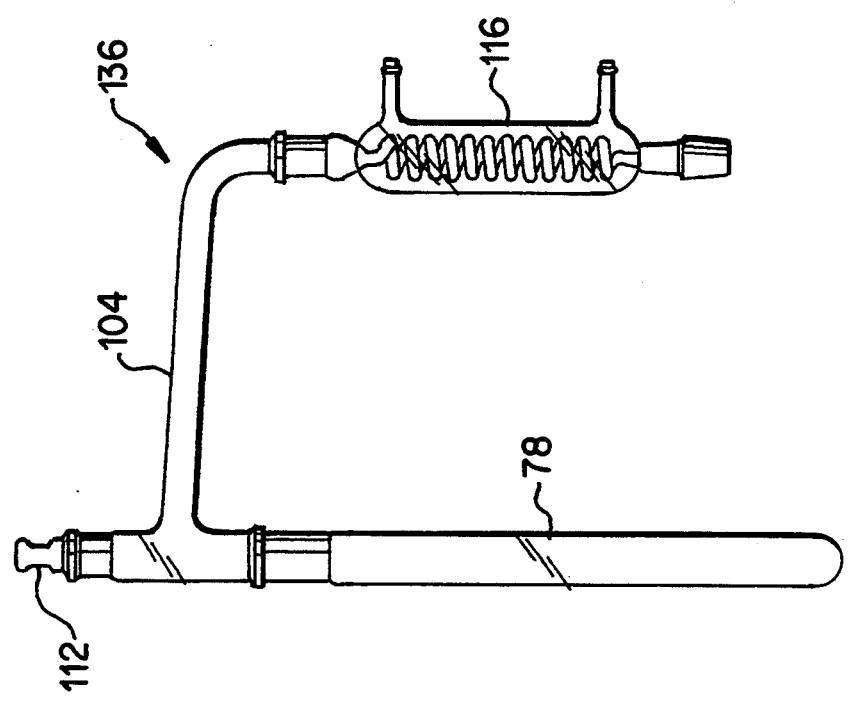
FIG. 26 is a front elevational view of a first embodiment of a first glassware assembly attached to a boiling tube for insertion into an aperture of the heater block of FIG. 6 of the mini-distillation and reflux system and kit.

FIGS. 26–29 show four embodiments of a first glassware assembly 136 for performing a basic distillation and made up of a mini-Graham condenser 1.16 attached to a sloped T-joint 104 which in turn is attached to the boiling tube 78. A first embodiment of the first glassware assembly 136 as shown in FIG. 26 also includes a stopper 112. The first embodiment is used to distill liquid samples under atmospheric conditions where the vapors generated in the heated boiling tube 78 are condensed in a mini-Graham condenser 116 and the condensed liquid distillate is collected in an open collection vessel (not shown).

Figure 27:
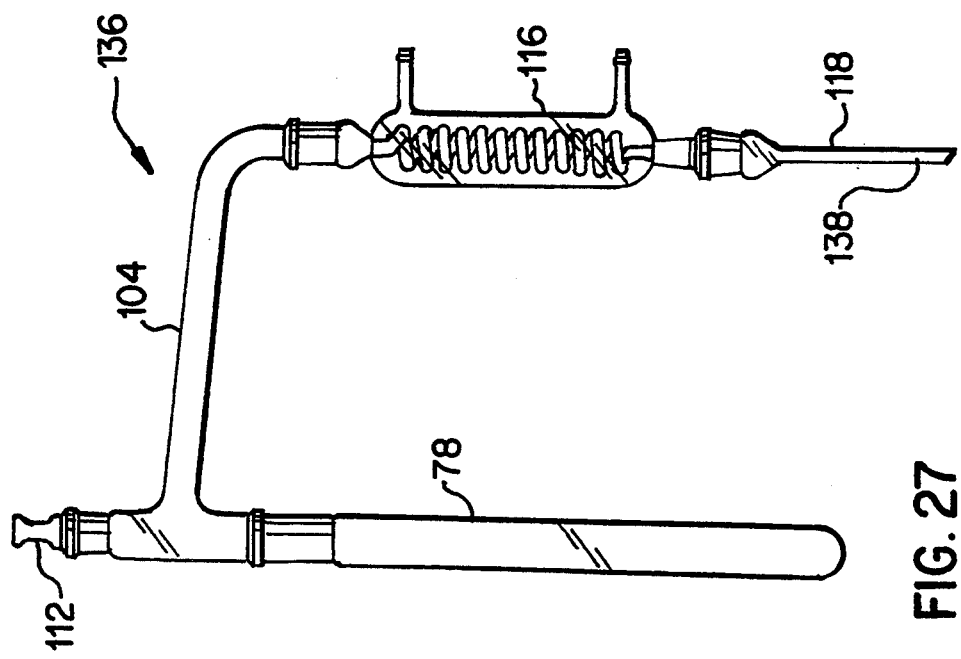
FIG. 27 is a front elevational view of a second embodiment of the first glassware assembly and attached boiling tube of FIG. 26.

A second embodiment of the first glassware assembly 136 is shown in FIG. 27 which in addition to the components of the first embodiment in FIG. 26 includes a condenser stem 118. The second embodiment is used to distill liquid samples under atmospheric conditions in a manner similar to the first embodiment except that the second embodiment is used to collect distillates that require immediate chemical stabilization or preservation. The generated sample vapors are condensed in a mini-Graham condenser 116. The condensed liquid distillate drips down an extender tube 138 and is collected in a preservative solution contained in a collection vessel (not shown). The extender tube 138 is submerged in the preservative solution.

Figure 28:
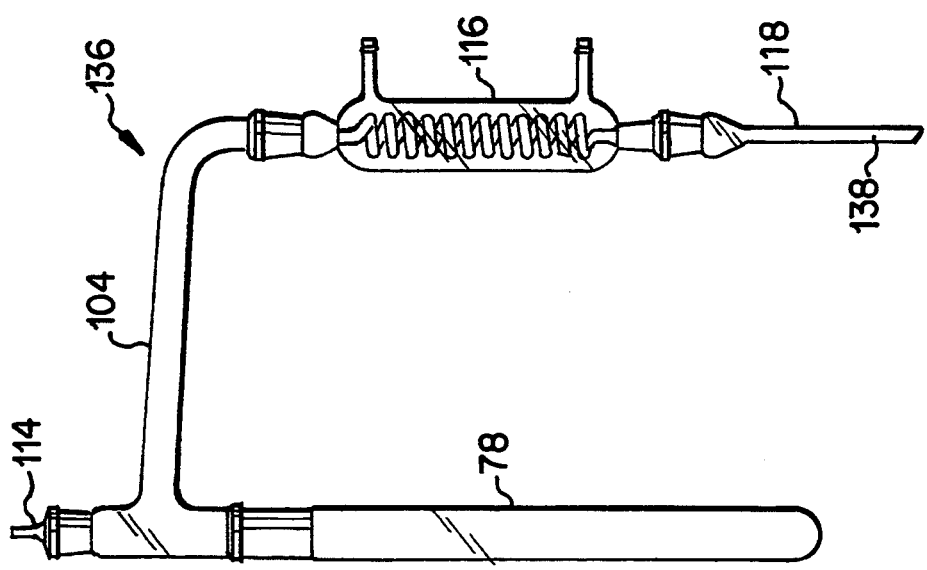
FIG. 28 is a front elevational view of a third embodiment of the first glassware assembly and attached boiling tube of FIG. 26.

A third embodiment of the first glassware assembly 136 is shown in FIG. 28 which is similar to the second embodiment shown in FIG. 27 but replaces the stopper 112 with a gas inlet 114. The third embodiment is used to distill liquid samples in a manner similar to the first embodiment except that the third embodiment is used to collect distillates that require distillation under an inert gas atmosphere and also require immediate chemical stabilization or preservation. An inert gas is introduced into the top of the T-joint 104 via gas inlet 114. The generated sample vapors are condensed in a mini-Graham condenser 116. The condensed liquid distillate drips down an extender tube 138 and is collected in a preservative solution contained in a collection vessel (not shown). The extender tube 138 is submerged in the preservative solution.

Figure 29:
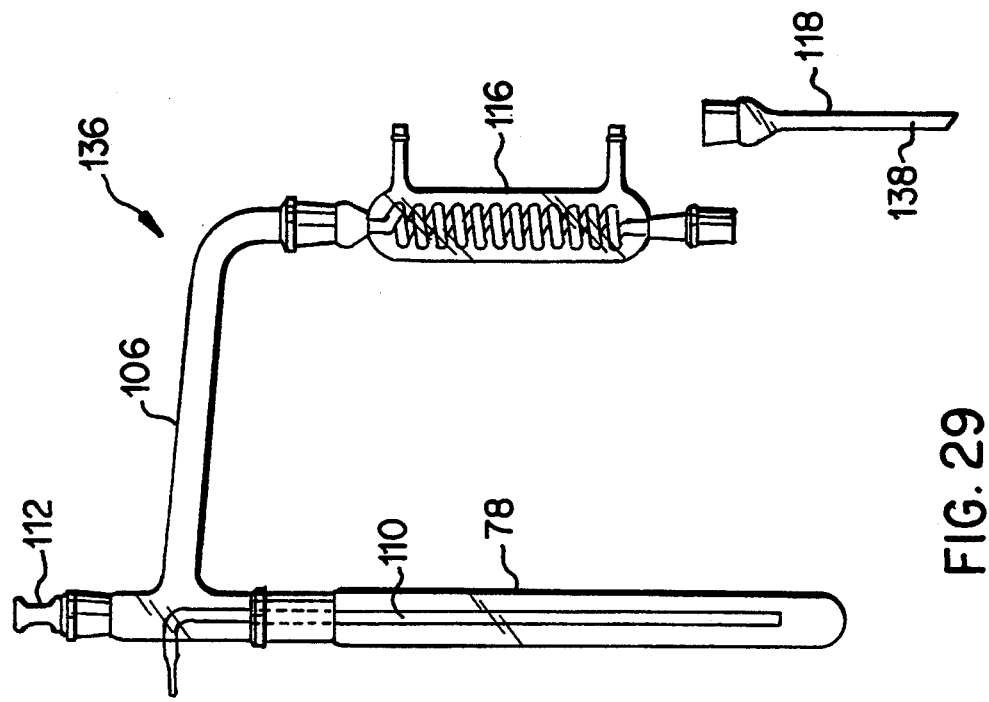
FIG. 29 is a front elevational view of a fourth embodiment of the first glassware assembly and attached boiling tube of FIG. 26.

A fourth embodiment of the first glassware assembly 136 is shown in FIG. 29 as similar to the second embodiment shown in FIG. 27 including the stopper 112 and the condenser stem 118 but in addition replaces T-joint 104 with T-joint with gas bubbler 106, with the bubbler stem 110 extending down into the boiling tube 78. The fourth embodiment is used to distill liquid samples in a manner similar to that of the first embodiment except that the fourth embodiment is used to distill samples that require agitation or mixing of the boiling tube contents during the distillation. An inert gas is introduced into the T-joint with gas bubbler 106 at the top of the bubbler stem 110 and exits the bottom of the bubbler stem 110 which extends to the bottom of the boiling tube 78. The bubbling action agitates the heated sample and replaces the magnetic stirring often used for conventional distillations. The generated sample vapors are condensed in a mini-Graham condenser 116 and the condensed liquid distillate is collected in an open collection vessel (not shown). If the distillate requires immediate chemical stabilization or preservation, the fourth embodiment can also use the condenser stem 118. If the condenser stem 118 is used, the condensed liquid distillate drips down an extender tube 138 and is collected in a preservative solution contained in a collection vessel (not shown). The extender tube 138 is submerged in the preservative solution.

Figure 30:
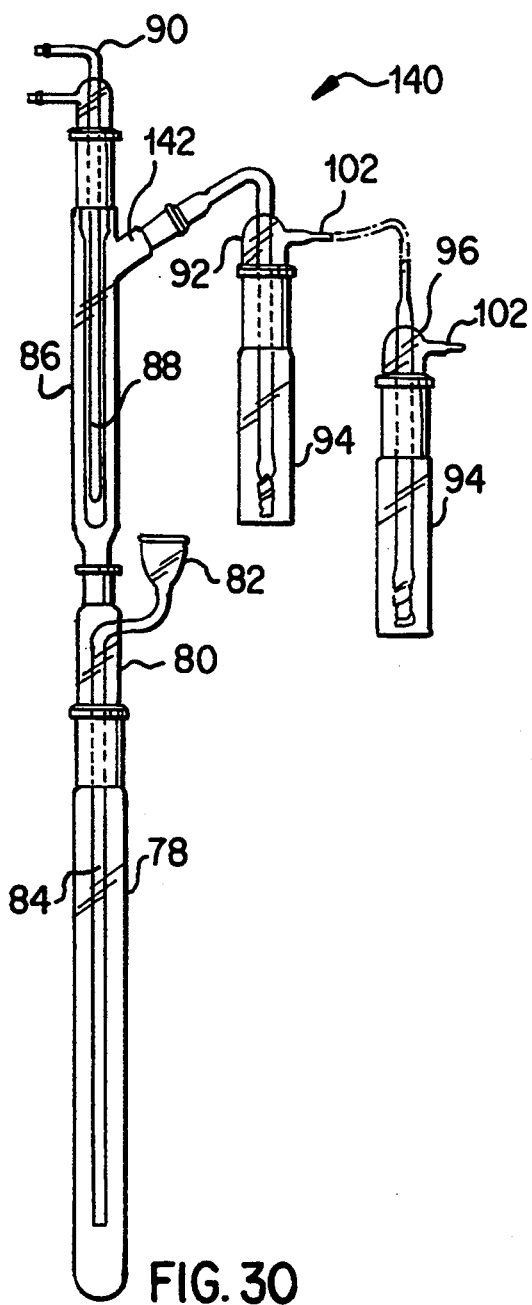
FIG. 30 is a front elevational view of a first embodiment of a second glassware assembly attached to a boiling tube for insertion into an aperture of the heater block of FIG. 6 of the mini-distillation and reflux system and kit.
Figure 31:
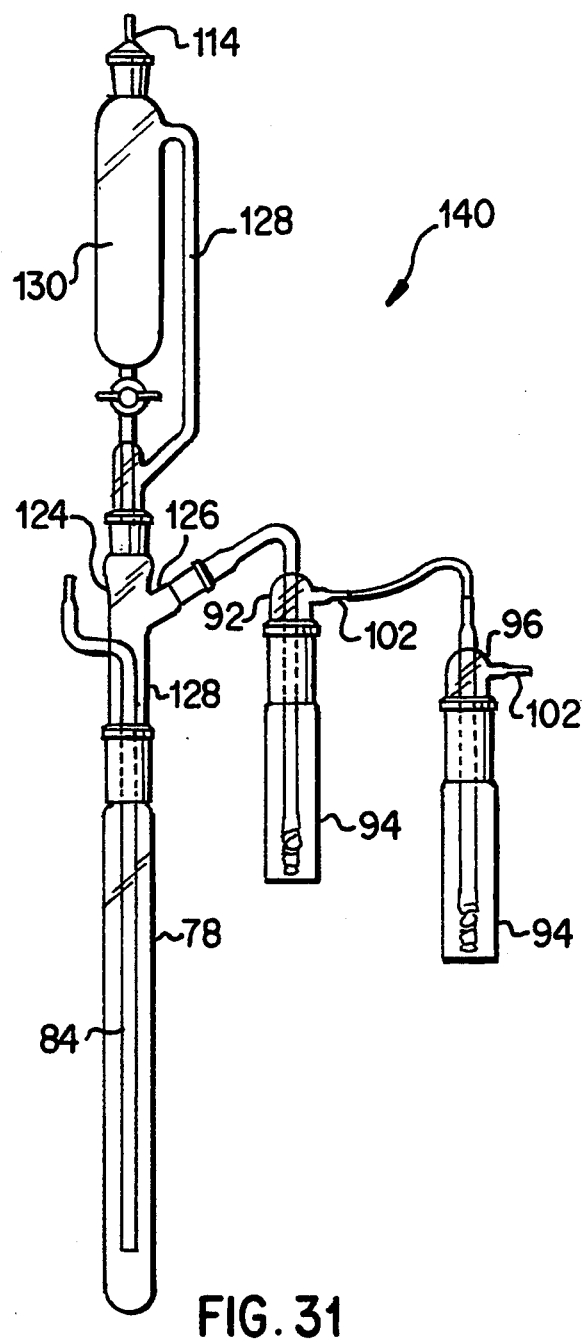
FIG. 31 is a front elevational view of a second embodiment of the second glassware assembly and attached boiling tube of FIG. 30.

A second glassware assembly 140 having two embodiments as shown in FIGS. 30 and 31 is used for gas evolution distillation. FIG. 30 shows a first embodiment having a reagent inlet tube adapter 80 connecting a boiling tube 78 to a cold finger condenser jacket 86 and also serves as the inlet for air flow and adding reagents since the inlet's funnel shape 82 accommodates pouring of reagents. The cold finger condenser 88 is surrounded by a jacket 86. The exit port 142 of the cold finger condenser jacket 86 is attached to a bubbler 92. The bubbler 92 is contained in a bubbler vessel 94 and has a vacuum inlet stem 102 which may be attached in series to a second bubbler 96.

The first embodiment is used to distill a liquid matrix sample and collect gases that are generated during the distillation process. The distillation is carried out under a flow of air created by a vacuum applied to the vacuum inlet stem 102 of the bubbler 92 of the second glassware assembly 140. The liquid sample and distillation reagents are heated in the boiling tube 78 where both gases and vapors are generated. The gases and vapors are carried by a flow of air through a cold finger condenser jacket 86 where vapors are condensed by the cold finger condenser 88 and drip down into the boiling tube 78. The gases are not condensed and flow forward through a bubbler 92 and bubbler vessel 94 containing a solution to chemically trap and retain the gas species. A second bubbler 96 can be attached in series with the first bubbler 92 to allow greater chemical trapping capacity of gases and different trapping solutions can be placed in each bubbler vessel 94 to selectively trap or remove different gases.

A second embodiment of the second glassware assembly 140 is shown in FIG. 31. An inlet adapter 124 connects a boiling tube 78 to a side arm addition funnel 130 and to a first bubbler 92. The bubbler 92 is contained in a bubbler vessel 94 and has a vacuum inlet stem 102 which may be attached in series to a second bubbler 96. The inlet adapter 124 includes a long gas inlet stem 84 and the side arm addition funnel 130 includes a gas inlet 114.

The second embodiment is used to generate and collect gases under inert gas flow without the use of a cold finger condenser 88 and jacket 86. The use of a side arm addition funnel 130 allows the addition of reagents from the funnel 130 to the sealed apparatus while maintaining inert gas flow throughout the second glassware assembly 140. The liquid sample is placed in the boiling tube 78 and the liquid reagent is placed in the side arm addition funnel 130. The second glassware assembly 140 is sealed and inert gas flow is introduced at the top of the side arm addition funnel 130 via a gas inlet 114 and at the top of the gas inlet stem 84 of inlet adapter 124. The reagent is released from the side arm addition funnel 130 into the heated boiling tube contents. The inert gas, and gases and vapors generated from the sample, flow forward through the inlet adapter 124 to a bubbler 92 and bubbler vessel 94 containing a solution to chemically trap and retain the gas species. A second bubbler 96 can be attached in series to first bubbler 92 to allow greater chemical trapping capacity of gases or different trapping solutions can be placed in each bubbler vessel 94 to selectively trap or remove different gases.

A third glassware assembly 144 having three embodiments as shown in FIGS. 32–34 is used for refluxing and digestion processes. FIG. 32 shows a first embodiment having a joint reducer 134 connecting a boiling tube 78 to mini-Graham condenser 116. The first embodiment operates as a basic reflux apparatus by having liquid contents placed in the boiling tube 78 heated to boiling such that the generated vapors rise to the condenser 116. The vapors are condensed in the condenser 116 and the liquid condensate drips from the condenser 116 and returns to the boiling tube 78.

FIG. 33 shows a second embodiment similar to the first embodiment of FIG. 32, but incorporating a side arm addition funnel 130 attached to the top of mini-Graham condenser 116. The second embodiment refluxes sample in a manner similar to the first embodiment of the third glassware assembly 144 but allows addition of a reagent solution held in the funnel 130 during the reflux process. Reagent solution is placed in the funnel 130 and liquid sample is placed in boiling tube 78. The glassware assembly is then attached to the boiling tube 78 and the boiling tube contents are heated to boiling. The generated vapors rise to the condenser 116 connected to the top of the boiling tube 78. The vapors are condensed in the condenser 116 such that the liquid condensate drips from the condenser 116 and returns to the boiling tube 78. A side arm addition funnel 130 connected to the top of the condenser 11.6 allows a liquid reagent to be dispensed through the condenser 116 and into the refluxing contents of the boiling tube 78. The stopcock 132 of the sidearm addition funnel 130 can be adjusted to allow a slow addition of reagent over time.

FIG. 34 shows a third embodiment in which a joint reducer 134 connects a boiling tube 78 to a side arm addition funnel 130. The third embodiment allows heated chemical digestion of samples that do not require refluxing. Digestion reagent is placed in the side arm addition funnel 130. Sample is placed in boiling tube 78 and the sidearm addition funnel 130 is connected to the top of the boiling tube 78. Sample is heated and digestion reagent is dispensed into the boiling tube 78 at a desired rate.

In operation, the mini-distillation and reflux systems works as follows. Sample is prepared and placed in a boiling tube 78. The correct glassware assembly for the appropriate type of distillation or reflux to be performed is chosen and connected to the boiling tube 78. For those glassware assemblies having hanging glassware pieces, most notably the bubblers, which could tend to become disconnected from the glassware assemblies due to the weight of the collected liquids, plastic clips such as Keck clips, patent pending, or spring clamps may be used to more securely attach the glassware pieces to the assemblies.

The boiling tube 78 with the attached glassware assembly is then placed in one of the large apertures 24 of the heater block 14 and thus becomes free-standing during the performance of the distillation or reflux.

Depending upon the particular type of distillation or reflux to be performed, the vacuum or gas hoses 76 and/or the condenser water hoses 64, 66 may be connected to the glassware assemblies 136, 140, 144. The inert gas or vacuum and/or the condenser water is then applied to the assembly as dictated by distillation or reflux method.

The heat source 12 is turned on to the appropriate temperature for the particular type of distillation or reflux to be carried out. The heat source 12 is in contact with the heater block 14 and warms the heater block 14 through conduction. The heater block 14 in turn warms the boiler tube 78 and its contents.

The forms of the invention shown and described in this disclosure represent illustrative preferred embodiments thereof. It is understood that the invention is defined in the claimed subject matter which follows and that various modifications in light of reading the description are incorporated therein.

I claim:

1. Apparatus for performing a plurality of distillation and reflux operations simultaneously within a compact space comprising:

a plurality of boiling tube means for holding a plurality of predetermined volumes of sample;

means for heating said plurality of predetermined volumes of sample held in said plurality of boiling tube means in order to perform said plurality of distillation and reflux operations simultaneously within a compact space wherein said means for heating includes a heat source and a heater block with said heater block having a bottom surface in contact with said heat source and a top surface with a plurality of apertures therethrough, said plurality of apertures being of a shape and size to hold said plurality of boiling tubes in a freestandingly, approximately upright position during said distillation and reflux operations; and a plurality of varyingly-shaped, miniaturized glassware means for interchangeably connecting to each other to form a plurality of glassware assembly means of various configurations for connection to said plurality of boiling tubes which are inserted into said plurality of apertures of said heater block in order to perform said plurality of distillation and reflux operations on said plurality of predetermined volumes of sample in said plurality of boiling tubes simultaneously within a compact space.

2. The apparatus as in claim 1 wherein said top and bottom surfaces of said heater block have a top and bottom surface areas, respectively, such that said bottom surface area is larger than said top surface area to provide stability to said heater block against tipping over and to provide more surface area for contacting said heat source.

3. The apparatus as in claim 2 wherein said plurality of apertures have an approximately one-inch circular diameter extending transversely through said top surface of said heater block almost to said bottom surface of said heater block and are U-shaped in cross section in order to hold said boiling tubes with attached glassware assembly means freestandingly upright and unsupported by a lattice during said distillation and reflux operations.

4. The apparatus as in claim 3 further comprising at least one thermometer and a second plurality of apertures wherein said second plurality of apertures have an approximately one-fourth inch circular diameter extending transversely through said top surface of said heater block almost to said bottom surface of said heater block and are U-shaped in cross-section to hold said at least one thermometer freestandingly upright during said distillation and reflux operations in order to monitor temperature of said heater block.

5. The apparatus as in claim 4 wherein said heater block is made of aluminum and said heater block has an inverted T-shaped cross-section.

6. The apparatus as in claim 5 wherein said heat source comprises at least one hotplate.

7. The apparatus as in claim 6 further comprising a tubing distribution means which includes a tubing distribution panel positioned above said heater block by support rods inserted through apertures of T-shaped supports connected to said heater block, said tubing distribution panel having a main channel leading from a gas or vacuum source to a plurality of valves for attachment to said glassware assembly means via flexible tubing for for said distillation or reflux operations.

8. The apparatus as in claim 7 wherein said tubing distribution means further comprises condenser water inlet and outlet hoses supported by said tubing distribution panel, said condenser water inlet hose for connection of a condenser water source to initial glassware assembly means and said condenser water outlet hose for connection of a last glassware assembly means to a condenser water drain or collector in order for said glassware assembly means to be connected in series for flowing condenser water through said glassware assembly means for said distillation or reflux operations.

9. The apparatus as in claim 8 wherein said glassware assembly means is a first glassware assembly means for connection to one of said boiling tubes comprising:
a sloped T-joint having a sloped arm with a free end and a non-free end such that said non-free end is integrally attached to a crossbar at a midsection of said crossbar and wherein said sloped arm slopes away from a first end of said crossbar and toward a second end of said crossbar such that said second end of said crossbar is connected to one of said boiling tubes and said arm of said sloped T-joint is connected to a mini-Graham condenser of said free end of said sloped T-joint.

10. The apparatus as in claim 9 wherein said first glassware assembly means is further comprised of a stopper connected to said first end of said crossbar of said sloped T-joint.

11. The apparatus as in claim 10 wherein said first glassware assembly means is further comprised of a condenser stem connected to said mini-Graham condenser.

12. The apparatus as in claim 9 wherein said first glassware assembly means is further comprised of a gas inlet connected to said first end of said crossbar of said sloped T-joint and a condenser stem connected to said mini-Graham condenser.

13. The apparatus as in claim 9 wherein said sloped T-joint is a sloped T-joint with gas bubbler comprised of an inlet tube within said crossbar of said sloped T-joint such that said inlet tube and said crossbar intersect at a wall of said crossbar to form an integral glass part at said intersection and wherein said glassware assembly means is further comprised of a second condenser stem for connection to said mini-Graham condenser during a particular application of said distillation and reflux operations.

14. The apparatus as in claim 13 wherein said sloped T-joint with gas bubbler is an adapter means for allowing said boiling tube to function as a multi-necked flask.

15. The apparatus as in claim 8 wherein said glassware assembly means is a second glassware assembly means for connection to one of said boiling tubes comprised of:
a first bubbler connected to a Y-shaped glassware means, said Y-shaped glassware piece having a tubular main portion and a second portion connected to said main portion to form a Y such that said bubbler is attached to said second portion; and
a second bubbler for connection in series with said first bubbler during a second particular application of said distillation and reflux operations.

16. The apparatus as in claim 15 wherein said Y-shaped glassware means is a cold finger condenser jacket and wherein said second glassware assembly means is further comprised of an adapter connected to said boiling tube on one end and a cold finger condenser jacket surrounding a cold finger condenser jacket on another end and wherein said adapter is a reagent inlet tube adapter having a tubular main section, an inlet tube ending in a funnel-shaped inlet on a first side of said inlet tube and a noncrimped stem on a second side of said inlet tube such that said inlet tube is partially within said adapter and intersects said adapter at a wall of said tubular main section in order for said inlet tube and said adapter to form an integral glass part at said intersection.

17. The apparatus as in claim 15 wherein said Y-shaped glassware piece is a Y-shaped adapter having a tubular main section connected to a boiling tube on one end and a side arm addition funnel on another end, an upwardly sloped port connected to said main section to form a Y and an inlet tube partially within said main section of said adapter such that said inlet tube intersects a wall of said main section to form an integral glass part at said intersection.

18. The apparatus as in claim 17 wherein said Y-shaped adapter is an adapter means for allowing said boiling tube to function as a multi-necked flask.

19. The apparatus as in claim 16 wherein said adapter is a means for allowing said boiling tube to function as a multi-necked flask.

20. The apparatus as in claim 8 wherein said glassware assembly means is a third glassware assembly means comprised of a joint reducer attached to one of said boiling tubes.

21. The apparatus as in claim 20 wherein said third glassware assembly means is further comprised of a mini-Graham condenser connected to said joint reducer.

22. The apparatus as in claim 21 wherein said third glassware assembly means is further comprised of a side arm addition funnel connected to said mini-Graham condenser.

23. The apparatus as in claim 20 wherein said third glassware assembly means is further comprised of a side arm addition funnel connected to said joint reducer.

24. A kit for performing a plurality of distillation and reflux operations simultaneously within a compact space comprising:
means for compactly housing said kit in order to transport said kit easily;
a plurality of boiling tube means for holding a plurality of predetermined volumes of sample;
means for heating said plurality of predetermined volume of sample held in said plurality of boiling tube means in order to perform said plurality of distillation and reflux operations simultaneously within a compact space wherein said means for heating includes a heat source and a heater block wherein said heater block has a plurality of apertures for holding said plurality of boiling tubes upright when said heater block is placed on top of and in contact with said heat source; and a plurality of miniaturized glassware means for interchangeably connecting to each other in order to form various glassware assembly means for connection to boiling tubes for insertion of said boiling tubes into said apertures of said heater block in order to perform said plurality of distillation and reflux operations simultaneously at a single heat source within a compact space.

25. The kit as in claim 24 further comprising a tubing distribution means including a tubing distribution panel having a main channel leading from a gas or vacuum source to a plurality of valves, gas or vacuum hoses for connection of said valves to said glassware assembly means, a condenser water inlet hose for connection of a condenser water source to an initial glassware assembly means and a condenser water outlet hose for connection of a last glassware assembly means to a condenser water drain or outlet in order for said glassware assembly means to be connected in series for flowing condenser water through said glassware assembly means for a application of said distillation or reflux operations.

26. The kit as in claim 25 wherein said glassware pieces include a reagent inlet tube adapter, a cold finger condenser and jacket, a bubbler and bubbler vessel, a sloped T-joint, a stopper, a gas inlet, a mini-Graham condenser, a condenser stem, a Y-shaped adapter, a side arm addition funnel, a T-joint with gas bubbler, a second bubbler and a joint reducer.

27. The kit as in claim 26 wherein said reagent inlet tube adapter includes a tubular section and a Z-shaped inlet tube, said inlet tube ending in a funnel-shaped inlet on a first end and a noncrimped stem on a second end and said inlet tube being partially within said adapter such that said inlet tube intersects a wall of said tubular section in order for said inlet tube and said adapter to form an integral glass part at said intersection.

28. The kit as in claim 27 wherein said reagent inlet tube adapter is an adapter means for allowing said boiling tube to function as a multi-necked flask.

29. The kit as in claim 26 wherein said Y-shaped adapter includes a tubular main section, an upwardly sloped tubular exit port attached to said main section to form a Y and a Z-shaped inlet tube, said inlet tube ending in a crimped stem on a first end and a noncrimped stem on a second end and said inlet tube being partially within said main section such that said inlet tube intersects a wall of said tubular main section of said adapter in order for said inlet tube and said adapter to form an integral glass part at said intersection.

30. The kit as in claim 29 wherein said Y-shaped adapter is an adapter means for allowing said boiling tube to function as a multi-necked flask.

31. The kit as in claim 26 wherein said sloped T-joint with gas bubbler includes a tubular sloped arm, a tubular crossbar and an L-shaped inlet tube, said inlet tube ending in a crimped stem on a first end and a noncrimped stem on a second end and said inlet tube being partially within said tubular crossbar such that said inlet intersects said crossbar to form an integral glass part at said intersection.

32. The kit as in claim 31 wherein said sloped T-joint with gas bubbler and L-shaped inlet tube form an adapter means for allowing said boiling tube to function as a multi-necked flask.

* * * * *